(12) United States Patent
Yang

(10) Patent No.: US 11,450,290 B2
(45) Date of Patent: Sep. 20, 2022

(54) PIXEL STRUCTURE, DISPLAY PANEL AND DISPLAY DEVICE

(71) Applicants: HKC CORPORATION LIMITED, Shenzhen (CN); CHONGQING HKC OPTOELECTRONICS TECHNOLOGY CO., LTD., Chongqing (CN)

(72) Inventor: Yanna Yang, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 557 days.

(21) Appl. No.: 16/311,695

(22) PCT Filed: Oct. 22, 2018

(86) PCT No.: PCT/CN2018/111169
§ 371 (c)(1),
(2) Date: Dec. 20, 2018

(87) PCT Pub. No.: WO2020/047955
PCT Pub. Date: Mar. 12, 2020

(65) Prior Publication Data
US 2021/0225301 A1 Jul. 22, 2021

(30) Foreign Application Priority Data
Sep. 3, 2018 (CN) .......................... 201811020796.1

(51) Int. Cl.
*G09G 3/36* (2006.01)
*G02F 1/1362* (2006.01)
*G02F 1/1368* (2006.01)

(52) U.S. Cl.
CPC ......... *G09G 3/3607* (2013.01); *G02F 1/1368* (2013.01); *G02F 1/13624* (2013.01); *G02F 1/136286* (2013.01); *G09G 3/3696* (2013.01)

(58) Field of Classification Search
CPC .. G09G 3/3677; G09G 3/3648; G09G 3/3688; G09G 3/3674; G09G 2300/0447;
(Continued)

(56) References Cited

U.S. PATENT DOCUMENTS

2014/0204326 A1\* 7/2014 Wu .................... G02F 1/136286
349/143
2015/0234238 A1\* 8/2015 Chen ................. G02F 1/133707
349/33
(Continued)

FOREIGN PATENT DOCUMENTS

| CN | 1825172 A | 8/2006 |
| CN | 103744208 A | 4/2014 |

(Continued)

OTHER PUBLICATIONS

Meijun Dan, the ISA written comments, dated Jun. 2019, CN.

*Primary Examiner* — Xuemei Zheng

(57) ABSTRACT

A pixel structure, a display panel and a display device are disclosed. The pixel structure includes: a first subpixel, including a first horizontal trunk line and a first domain line that form a first angle; and a second subpixel, including a second horizontal trunk line and a second domain line that form a second angle.

18 Claims, 5 Drawing Sheets

(58) Field of Classification Search
CPC ......... G09G 2300/0443; G09G 3/3607; G09G 2300/0426; G09G 3/3696; G02F 1/134345; G02F 1/1368; G02F 1/136286; G02F 1/136227; G02F 1/13624
See application file for complete search history.

(56) References Cited

U.S. PATENT DOCUMENTS

2016/0299392 A1* 10/2016 Cheng .................. G02F 1/1368
2017/0108723 A1    4/2017 No et al.
2017/0219890 A1*  8/2017 Li ....................... H01L 27/1255
2018/0275444 A1*  9/2018 Feng ................. G02F 1/136286

FOREIGN PATENT DOCUMENTS

| CN | 105204259 A | 12/2015 |
|---|---|---|
| CN | 105892169 A | 8/2016 |
| CN | 107247370 A | 10/2017 |
| CN | 107942589 A | 4/2018 |

* cited by examiner

PIXEL STRUCTURE, DISPLAY PANEL AND DISPLAY DEVICE

This application claims priority to Chinese Patent Application No. 201811020796.1, filed with the Chinese Patent Office on Sep. 13, 2018 and entitled "DISPLAY PANEL AND DISPLAY DEVICE", which is incorporated herein by reference in its entirety.

TECHNICAL FIELD

This application relates to the field of display technologies, and in particular, to a pixel structure, a display panel and a display device.

BACKGROUND

The description herein provides only background information related to this application, but does not necessarily constitute the existing technology. With the development and advancement of scientific technologies, liquid crystal displays become mainstream products of displays owing to hotspot features of a thin design, power saving and low radiation, and are widely applied. A display controlled by an active switch includes a liquid crystal display, an organic light-emitting diode (OLED) display, and the like. Most conventional liquid crystal displays are backlight liquid crystal displays. The liquid crystal display includes a liquid crystal panel and a backlight module. The working principle of the liquid crystal panel is: Liquid crystal molecules are placed between two parallel glass substrates, and a drive voltage is applied across the two glass substrates to control rotating directions of the liquid crystal molecules, so that light in the backlight module is refracted out to generate an image. An OLED display, also referred to as an organic electroluminescent display, has advantages such as self-luminance, a fast response, a high definition and contrast, and a capability of achieving flexible display and large-area full color display. The superb performance and huge market potential of the OLED display attract many manufacturers and scientific research institutes worldwide to devote themselves to the production and research and development of OLED display panels. Due to advantages such as a high contrast and a quick response, the polymer stabilized vertical alignment (PSVA) technology is widely applied to LCD production. In this technology, an appropriate number of compound monomers are evenly added to liquid crystal materials. Then, the mixed liquid crystal materials are heated by using a heater to reach an isotropic state. When the liquid crystal mixture is cooled down to the normal temperature, the liquid crystal mixture can be in a nematic state. Then, the liquid crystal mixture is dripped into a liquid crystal cell, and a voltage is applied to the liquid crystal cell. When the applied voltage causes the liquid crystal molecules to be stably arranged, the compound monomers in the liquid crystal experience a polymerization reaction by means of ultraviolet irradiation or heating, and generate a polymer layer, so that the liquid crystal has an initial pre-tilt angle and PSVA alignment is implemented.

However, in a process of changing from a low gray scale to a high gray scale, the liquid crystal changes from a vertical state to a horizontal state. As a result, viewed at different viewing angles, the liquid crystal has relatively strong viewing angle dependency, causing relatively large color casts of the display.

SUMMARY

This application provides a pixel structure, a display panel, and a display device to reduce color casts.

To achieve the foregoing objective, this application provides a pixel structure, comprising:

a first subpixel and a second subpixel, wherein the first subpixel comprises a first horizontal trunk line and a first domain line, and an angle between the first horizontal trunk line and the first domain line is a first angle;

the second subpixel comprises a second horizontal trunk line and a second domain line, and an angle between the second horizontal trunk line and the second domain line is a second angle; and different voltages are applied to the first subpixel and the second subpixel.

Optionally, the first angle and the second angle are different.

Optionally, the pixel structure comprises:

a bidirectional thin film transistor, wherein two ends of the bidirectional thin film transistor are capable of voltage transmission;

a first bleeder portion, connected to one end of the bidirectional thin film transistor and the first subpixel; and a second bleeder portion, connected to the other end of the bidirectional thin film transistor and the second subpixel.

Optionally, one end of the first bleeder portion is connected to the first subpixel and a common voltage line of the pixel structure, and the other end is connected to the bidirectional thin film transistor; and one end of the second bleeder portion is connected to the second subpixel, and the other end is connected to the bidirectional thin film transistor.

Optionally, the pixel structure comprises a third subpixel, wherein the third subpixel comprises a third domain line and a third horizontal trunk line;

an angle between the third domain line and the third horizontal trunk line is a third angle; and the third angle and the first angle are different, and a same voltage is applied to the areas of the first subpixel and the third subpixel.

Optionally, the pixel structure comprises a third subpixel and a first vertical trunk portion, wherein the first vertical trunk portion is located in middle parts of the first subpixel, the second subpixel and the third subpixel, and intersects with and is perpendicular to the first horizontal trunk line, the second horizontal trunk line and a third horizontal trunk line;

the third subpixel comprises a third domain line and a third horizontal trunk line;

an angle between the third domain line and the third horizontal trunk line is a third angle;

the third angle and the second angle are different; and voltages of the second subpixel and the third subpixel are the same.

Optionally, the first angle, the second angle, and the third angle are in an angle range of 2° to 82°.

Optionally, the second angle is 45°, and the third angle is 28.4°.

Optionally, the pixel structure comprises a third subpixel, wherein the third subpixel comprises a third domain line and a third horizontal trunk line; an angle between the third domain line and the third horizontal trunk line is a third angle; and any two of the first angle, the second angle and the third angle are different.

Optionally, the pixel structure comprises a third subpixel, wherein the third subpixel comprises a third domain line and a third horizontal trunk line; an angle between the third domain line and the third horizontal trunk line is a third angle; and any two of the first angle, the second angle and the third angle are different, and voltages of any two of the first subpixel, the second subpixel and the third subpixel are different.

Another objective of this application is to provide a display panel, the display panel comprising:

a first substrate;

a second substrate, arranged opposite to the first substrate;

a liquid crystal layer, sandwiched between the first substrate and the second substrate;

a pixel structure, arranged on the first substrate, wherein the pixel structure comprises a first subpixel, a second subpixel, and a third subpixel; and the first subpixel comprises a first horizontal trunk line and a first domain line, and an angle between the first horizontal trunk line and the first domain line is a first angle;

the second subpixel comprises a second horizontal trunk line and a second domain line, and an angle between the second horizontal trunk line and the second domain line is a second angle;

the third subpixel comprises a third domain line and a third horizontal trunk line, and an angle between the third domain line and the third horizontal trunk line is a third angle; and different voltages are applied to the first subpixel and the second subpixel, and a same voltage is applied to the first subpixel and the third subpixel;

a bidirectional thin film transistor, wherein two ends of the bidirectional thin film transistor are capable of voltage transmission;

a first bleeder portion, connected to one end of the bidirectional thin film transistor and the first subpixel; and a second bleeder portion, connected to the other end of the bidirectional thin film transistor and the second subpixel, wherein one end of the first bleeder portion is connected to the first subpixel and a common voltage line of the display panel, and the other end is connected to the bidirectional thin film transistor;

one end of the second bleeder portion is connected to the second subpixel, and the other end is connected to the bidirectional thin film transistor; and both the first angle and the second angle are 45°, and the third angle is 28.4°.

Another objective of this application is to provide a display device, and the display device comprises the display panel described above.

The pixel structure in this application comprises the first subpixel and the second subpixel. By applying different voltages to the areas of the first subpixel and the second subpixel area, tilt angles of liquid crystal of the first subpixel and the second subpixel may be controlled to be different, and the liquid crystal turns from a vertical state to a horizontal state. As a result, when the display panel is viewed at different viewing angles, the liquid crystal has relatively strong viewing angle dependency, and visual compensation at different viewing angles is enhanced, and because liquid crystal deflection angles of the first subpixel and the second subpixel are different, color casts of the display panel can be reduced.

BRIEF DESCRIPTION OF DRAWINGS

The accompanying drawings included are used to provide a further understanding of the embodiments of this application. The accompanying drawings constitute a portion of the specification, illustrate examples of implementations of this application, and explain the principle of this application together with the text description. Obviously, the accompanying drawings in the following description are merely some embodiments of this application. For a person of ordinary skill in the art, the person may obtain other drawings according to these accompanying drawings without creative efforts. In the figures.

DETAILED DESCRIPTION

Figure 1:
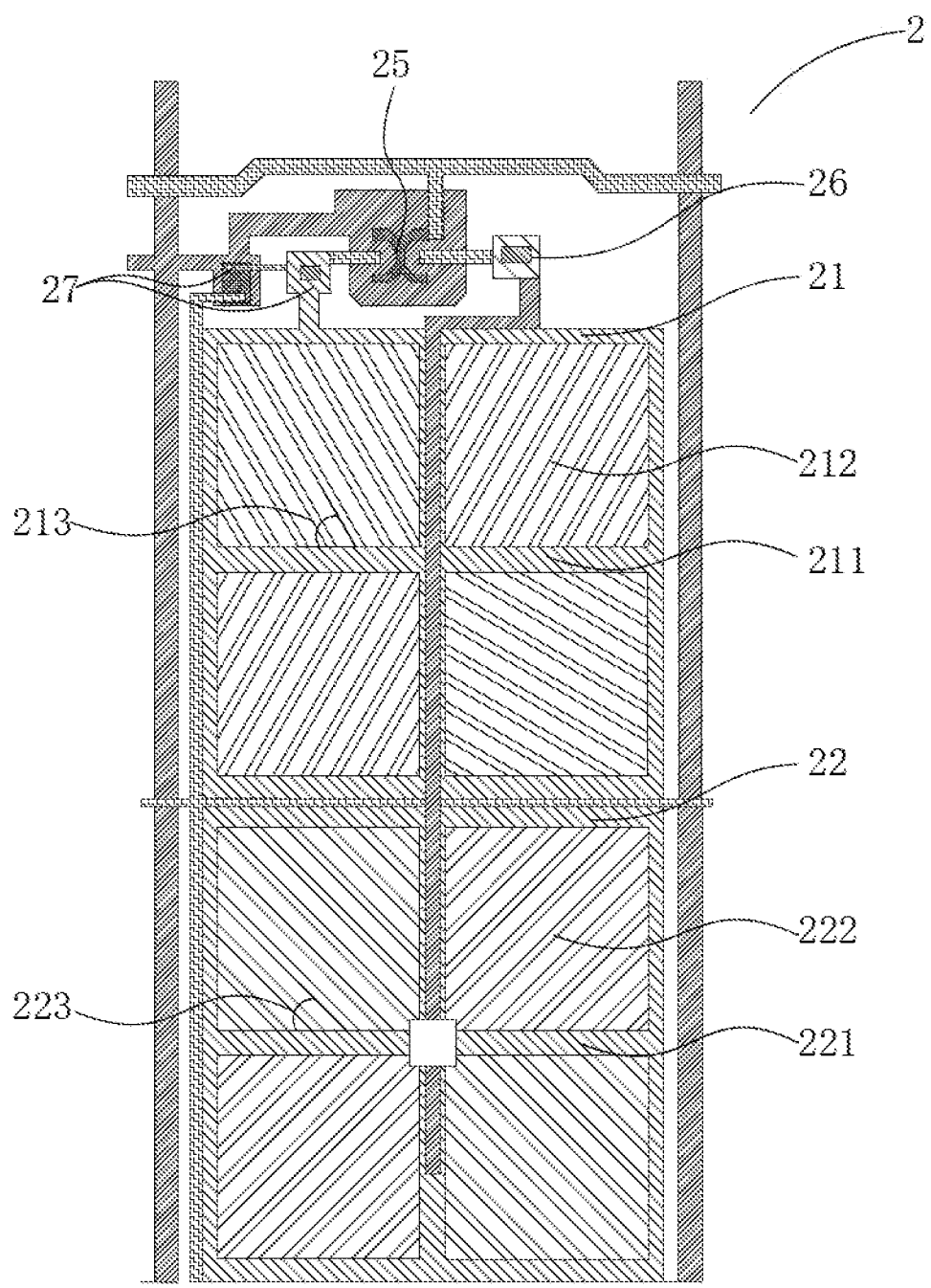
FIG. 1 is a schematic diagram of an 8-domain pixel structure according to an embodiment of this application.

Specific structures and functional details disclosed herein are merely representative, and are intended to describe the objectives of the exemplary embodiments of this application. However, this application may be specifically implemented in many alternative forms, and should not be construed as being limited to the embodiments set forth herein.

In the description of this application, it should be understood that orientation or position relationships indicated by the terms such as "center", "transverse", "on", "below", "left", "right", "vertical", "horizontal", "top", "bottom", "inside", and "outside" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of this application. In addition, the terms "first" and "second" are merely used for description purposes, but cannot be understood as indicating or denoting relative importance, or implicating or specifying the quantity of the indicated technical characteristics. Therefore, a feature defined by "first" or "second" can explicitly or implicitly include one or more of said features. In the description of this application, unless otherwise stated, "a plurality of" means two or more than two. In addition, the terms "include", "comprise" and any variant thereof are intended to cover non-exclusive inclusion.

In the description of this application, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. A person of ordinary skill in the art may understand the specific meanings of the foregoing terms in this application according to specific situations.

The terminology used herein is for the purpose of describing specific embodiments only and is not intended to be limiting of exemplary embodiments. As used herein, the singular forms "a", "an" and "the" are intended to include the plural forms as well, unless the context clearly indicates otherwise. It should be further understood that the terms "include" and/or "comprise" when used in this specification, specify the presence of stated features, integers, steps, operations, elements, and/or components, but do not preclude the presence or addition of one or more other features, integers, steps, operations, elements, components, and/or combinations thereof.

The following further describes this application with reference to the accompanying drawings and preferred embodiments.

Figure 4:
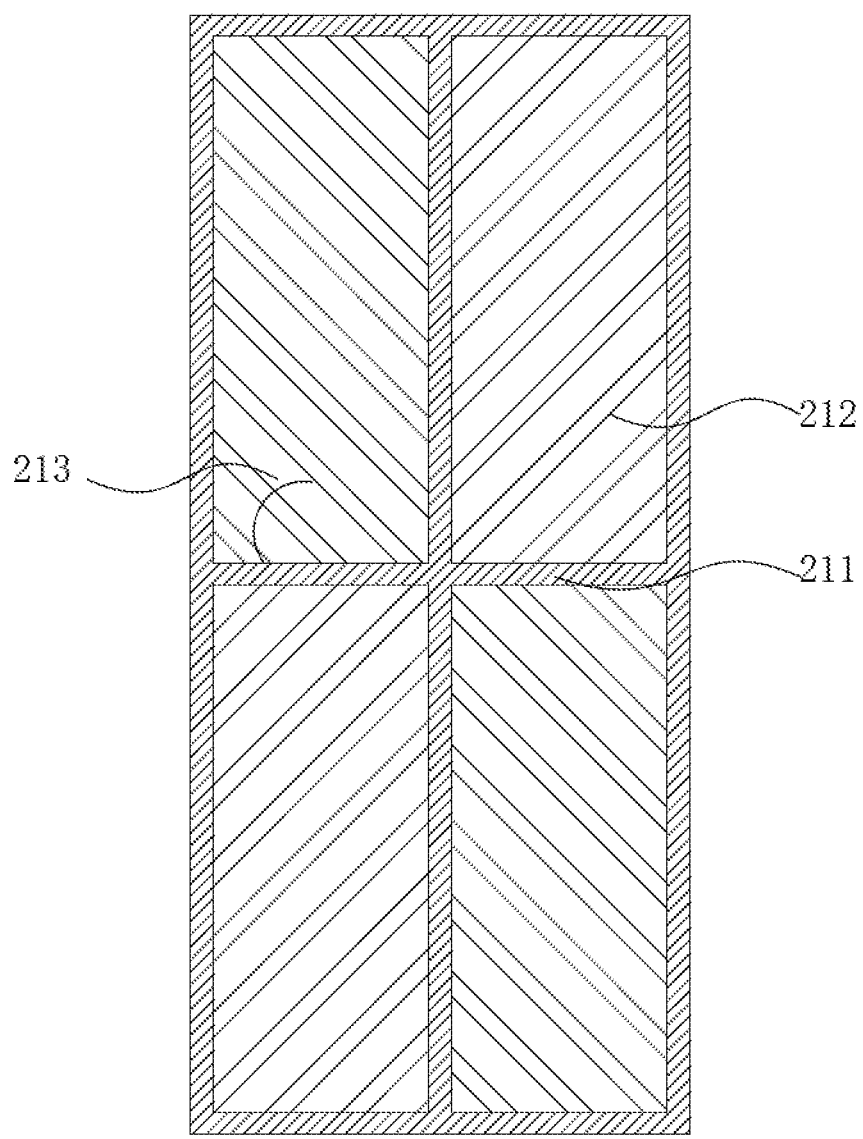
FIG. 4 is a schematic diagram of a 4-domain pixel structure according to an embodiment of this application.

FIG. 4 is a schematic diagram of a 4-domain pixel structure. This application makes an improvement based on the 4-domain pixel structure, to further alleviate color casts of a display panel.

As shown in FIG. 1, an embodiment of this application discloses a display panel. Referring to FIG. 1, it may be learned that, a pixel structure 2 includes:

a first subpixel 21 and a second subpixel 22, where a pixel electrode 214 of the first subpixel 21 includes a first horizontal trunk line 211 and a first domain line 212, and an acute angle between the first horizontal trunk line 211 and the first domain line 212 is a first angle 213;

a pixel electrode 224 of the second subpixel 22 includes a second horizontal trunk line 221 and a second domain line 222, and an acute angle between the second horizontal trunk line 221 and the second domain line 222 is a second angle 223;

different data voltages are applied to the first subpixel 21 and the second subpixel 22; wherein the first subpixel 21 and the second subpixel 22 are driven by only one same gate line 30 and one same data line 29.

The pixel structure 2 includes the first subpixel 21 and the second subpixel 22. By applying different data voltages to the areas of the first subpixel 21 and the second subpixel area 22, tilt angles of liquid crystal of the first subpixel 21 and the second subpixel 22 may be controlled to be different, and the liquid crystal turns from a vertical state to a horizontal state. As a result, when the display panel is viewed at different viewing angles, the liquid crystal has relatively strong viewing angle dependency, and visual compensation at different viewing angles is enhanced, and because liquid crystal deflection angles of the first subpixel 21 and the second subpixel 22 are different, color cast effects can be reduced.

In this embodiment, optionally, the first angle 213 and the second angle 223 are equal.

The first angle 213 and the second angle 223 are equal, and different data voltages are applied to the first subpixel 21 and the second subpixel 22. Therefore, a lighting structure does not need to be changed, and the tilt angles of the liquid crystal can be changed provided that a circuit structure is changed, so that visual compensation at different viewing angles is enhanced, color cast effects are reduced, and procedures in the process are reduced, thereby facilitating production.

In this embodiment, optionally, the pixel structure 2 includes: a bidirectional thin film transistor 25, where two ends of the bidirectional thin film transistor 25 are capable of transmitting a data voltage that is supplied from the data line 29;

a first bleeder portion 26, connected to one end of the bidirectional thin film transistor 25 and to the pixel electrode 214 of the first subpixel 21; and a second bleeder portion 27, connected to the other end of the bidirectional thin film transistor 25 and to the pixel electrode 224 of the second subpixel 22.

The two ends of the bidirectional thin film transistor 25 are capable of transmitting a data voltage that is supplied from the data line 29. The pixel electrodes 214 and 224 of the first subpixel 21 and the second subpixel 22 are connected to the bidirectional thin film transistor 25 by using the first bleeder portion 26 and the second bleeder portion 27, respectively. Data voltages are directed away by using the first bleeder portion 26 and the second bleeder portion 27, so that the voltages of the first subpixel 21 and the second subpixel 22 are different, and the tilt angles of the liquid crystal are changed, thereby enhancing visual compensation at different viewing angles and reducing color cast effects.

In this embodiment, optionally, one end 261 of the first bleeder portion 26 is directly coupled to the pixel electrode 214 of the first subpixel 21 and to a common voltage line 28 of the pixel structure 2, and the other end of the first bleeder portion 26 is directly coupled to the bidirectional thin film transistor 25.

One end 271 of the second bleeder portion 27 is directly coupled to the pixel electrode 224 of the second subpixel 22, and the other end of the second bleeder portion 27 is connected to the bidirectional thin film transistor 25.

Data voltages output at the two ends of the bidirectional thin film transistor 25 are the same. The pixel electrode 214 of the first subpixel 21 and the common voltage line 28 of the pixel structure 2 are connected at the first bleeder portion 26. A fraction of the voltage output by the bidirectional thin film transistor 25 is directed away by the common voltage line 28, and the pixel electrode 224 of the second subpixel 22 is directly connected to the bidirectional thin film transistor 25 by using the second bleeder portion 27 without using any other bleeder component, so as to achieve different voltages for the first subpixel 21 and the second subpixel 22.

In this embodiment, optionally, the first angle 213, the second angle 223 and a third angle 233 are in an angle range of 2° to 82°.

The first angle 213, the second angle 223 and the third angle 233 are set to 2° to 82°, so that color cast effects can be effectively compensated, thereby ensuring compensation in a relatively large viewing angle range, and ensuring an optimal state of display effect. In this application, the angle range is not limited to 2° to 82°.

Figure 2:
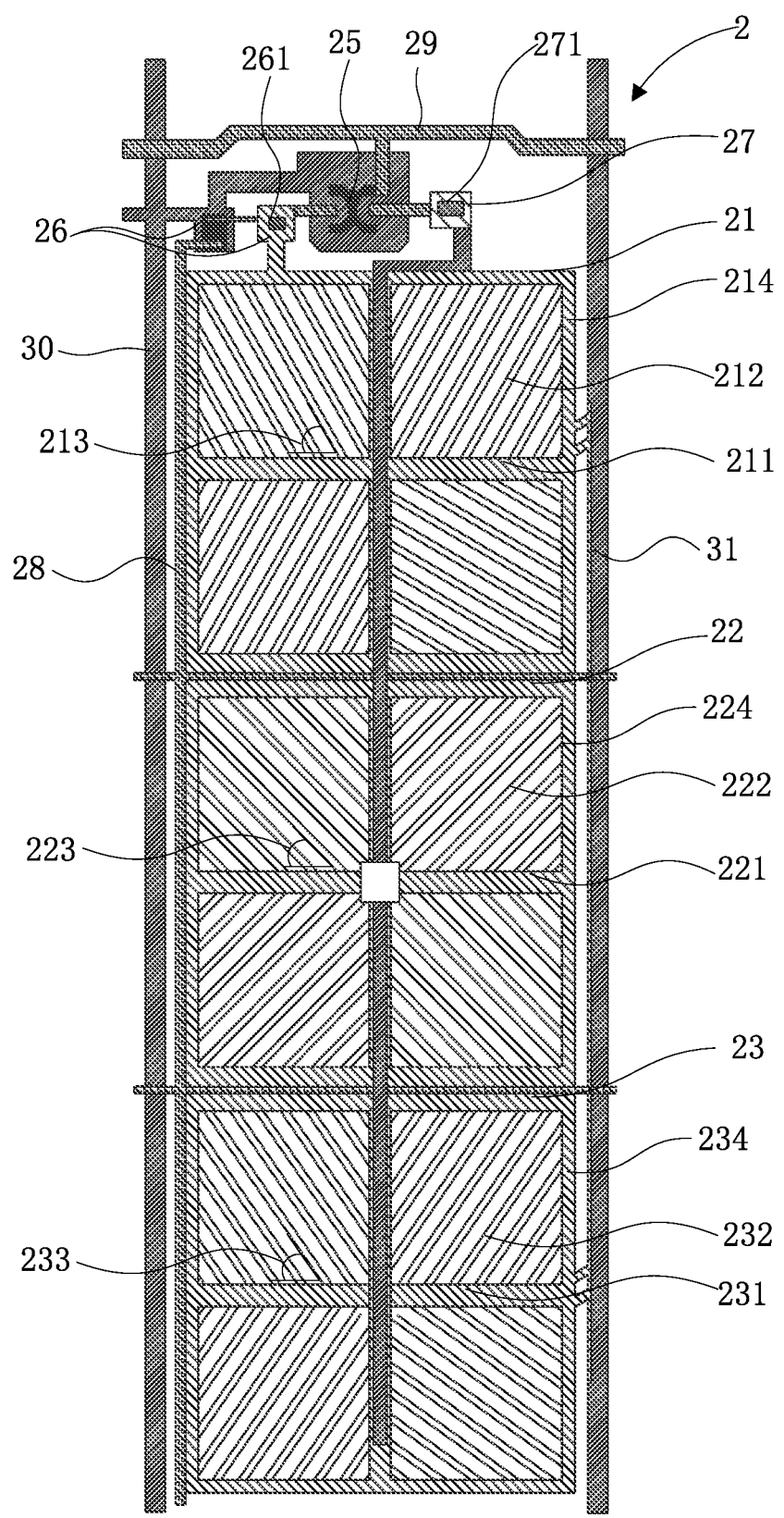
FIG. 2 is a schematic diagram of a 12-domain pixel structure according to an embodiment of this application.
Figure 6:
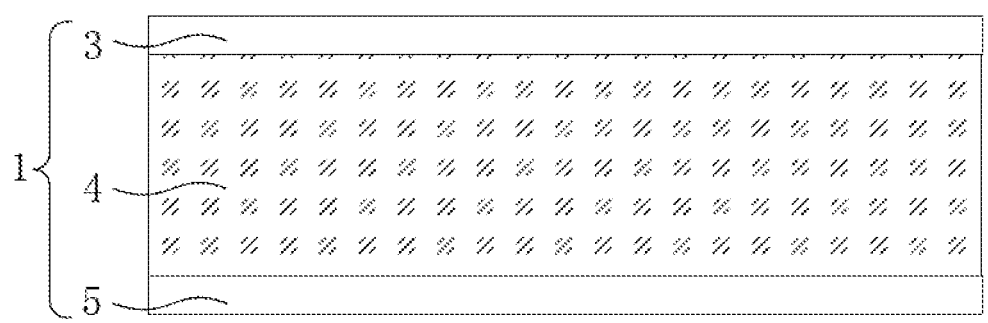
FIG. 6 is a schematic sectional diagram of a display panel according to an embodiment of this application.

In an optimal embodiment of this application, referring to FIGS. 2 and 6, a display panel 1 is disclosed, and the display panel 1 includes:

a first substrate 3;

a second substrate 5, arranged opposite to the first substrate 3;

a liquid crystal layer 4, sandwiched between the first substrate 3 and the second substrate 5; and a pixel structure 2, arranged on the first substrate 3, where the pixel structure 2 includes a first subpixel 21 and a second subpixel 22; and a pixel electrode 214 of the first subpixel 21 includes a first horizontal trunk line 211 and a first domain line 212, and an acute angle between the first horizontal trunk line 211 and the first domain line 212 is a first angle 213;

a pixel electrode 224 of the second subpixel 22 includes a second horizontal trunk line 221 and a second domain line 222, and an acute angle between the second horizontal trunk line 221 and the second domain line 222 is a second angle 223; and different data voltages are applied to the pixel electrodes 214 and 224 of the first subpixel 21 and the second subpixel 22.

The pixel structure 2 includes the first subpixel 21 and the second subpixel 22. By applying different data voltages to the areas of the first subpixel 21 and the second subpixel area 22, tilt angles of liquid crystal of the first subpixel 21 and the second subpixel 22 may be controlled to be different, and the liquid crystal turns from a vertical state to a horizontal state. As a result, when the display panel is viewed at different viewing angles, light passes through different And, the liquid crystal has relatively strong viewing angle dependency, and visual compensation at different viewing angles is enhanced, and because liquid crystal deflection angles of the first subpixel 21 and the second subpixel 22 are different, color cast effects can be reduced.

In this embodiment, optionally, the first angle 213 and the second angle 223 are equal.

The first angle 213 and the second angle 223 are equal, and different data voltages are applied to the pixel electrodes 214 and 224 of the first subpixel 21 and the second subpixel 22. Therefore, a lighting structure does not need to be changed, and the tilt angles of the liquid crystal can be changed provided that a circuit structure is changed, so that visual compensation at different viewing angles is enhanced, color cast effects are reduced, and procedures in the process are reduced, thereby facilitating production.

In this embodiment, optionally, the second angle 223 is 45°, and a third angle 233 is 28.4°.

The second angle 223 is 45°. 45° can ensure that the penetration rate of the liquid crystal of the second subpixel 22 reaches an optimal state. The third angle 233 is set to 28.4°, so that the penetration rate of the liquid crystal of a third subpixel 23 is 70% the penetration rate of the liquid crystal of the first subpixel 21 (70% is one condition, and for example, 10% to 99% all fall within the protection scope of this application). Because the second angle 223 and the third angle 233 are different, and voltages of the second subpixel 22 and the third subpixel 23 are the same, tilt angles of the liquid crystal in the areas of the first subpixel 21 and the third subpixel 23 are different, thereby achieving a visual compensation effect at different viewing angles. According to a penetration rate formula, when ø=45°, T can achieve an extremely large value, so that a ø angle of a ITO pattern is usually 450 (ø is an azimuth angle between an absorption axis of a deflection panel and a long axis of liquid crystal molecules. Because the absorption axis of the deflection panel is generally parallel to or perpendicular to glass substrates, ø may be understood as an angle between the ITO pattern and the horizontal or vertical direction herein. T represents the penetration rate of a liquid crystal cell; Δn represents molecular birefringence of liquid crystal; and d represents the thickness of the liquid crystal cell).

In this embodiment, optionally, the pixel structure 2 includes: a bidirectional thin film transistor 25, where two ends of the bidirectional thin film transistor 25 are capable of transmitting a data voltage that is supplied from the data line 29;

a first bleeder portion 26, connected to one end of the bidirectional thin film transistor 25 and to the pixel electrode 214 of the first subpixel 21; and a second bleeder portion 27, connected to the other end of the bidirectional thin film transistor 25 and to the pixel electrode 224 of the second subpixel 22.

The two ends of the bidirectional thin film transistor 25 are capable of transmitting a data voltage that is supplied from the data line 29. The pixel electrodes 214 and 224 of the first subpixel 21 and the second subpixel 22 are connected to the bidirectional thin film transistor 25 by using the first bleeder portion 26 and the second bleeder portion 27. Voltages are directed away by using the first bleeder portion 26 and the second bleeder portion 27, so that the voltages of the first subpixel 21 and the second subpixel 22 are different, and the tilt angles of the liquid crystal are changed, thereby enhancing visual compensation at different viewing angles and reducing color cast effects.

In this embodiment, optionally, the pixel structure 2 further includes a third subpixel 23.

The third subpixel 23 includes a third domain line 232 and a third horizontal trunk line 231;

An acute angle between the third domain line 232 and the third horizontal trunk line 231 is a third angle 233.

The third angle 233 and the first angle 213 are different, and data voltages applied to the areas of the first subpixel 21 and the third subpixel 23 are the same.

Based on the first subpixel 21 and the second subpixel 22, a group of third subpixels 23 are added to the pixel structure 2. An acute angle between the third domain line 232 and the third horizontal trunk line 231 on the third subpixel 23 is the third angle 233. The third angle 233 and the first angle 213 of the first subpixel 21 are different. The pixel electrodes 214 and 234 of the first subpixel 21 and the third subpixel 23 are connected by using a connection line 31 at a same side, so that data voltages applied to the areas of the first subpixel 21 and the third subpixel 23 are the same. The first angle 213 and the third angle 233 are different, and tilt angles of liquid crystal are different, thereby enhancing visual compensation of the liquid crystal at different viewing angles and reducing color cast effects.

In this embodiment, optionally, the first angle 213, the second angle 223, and the third angle 233 are in an angle range of 2° to 82°.

The first angle 213, the second angle 223 and the third angle 233 are set to 2° to 82° so that color cast effects can be effectively compensated, thereby ensuring compensation in a relatively large viewing angle range, and ensuring an optimal state of display effect. In this application, the angle range is not limited to 2° to 82°.

Figure 3:
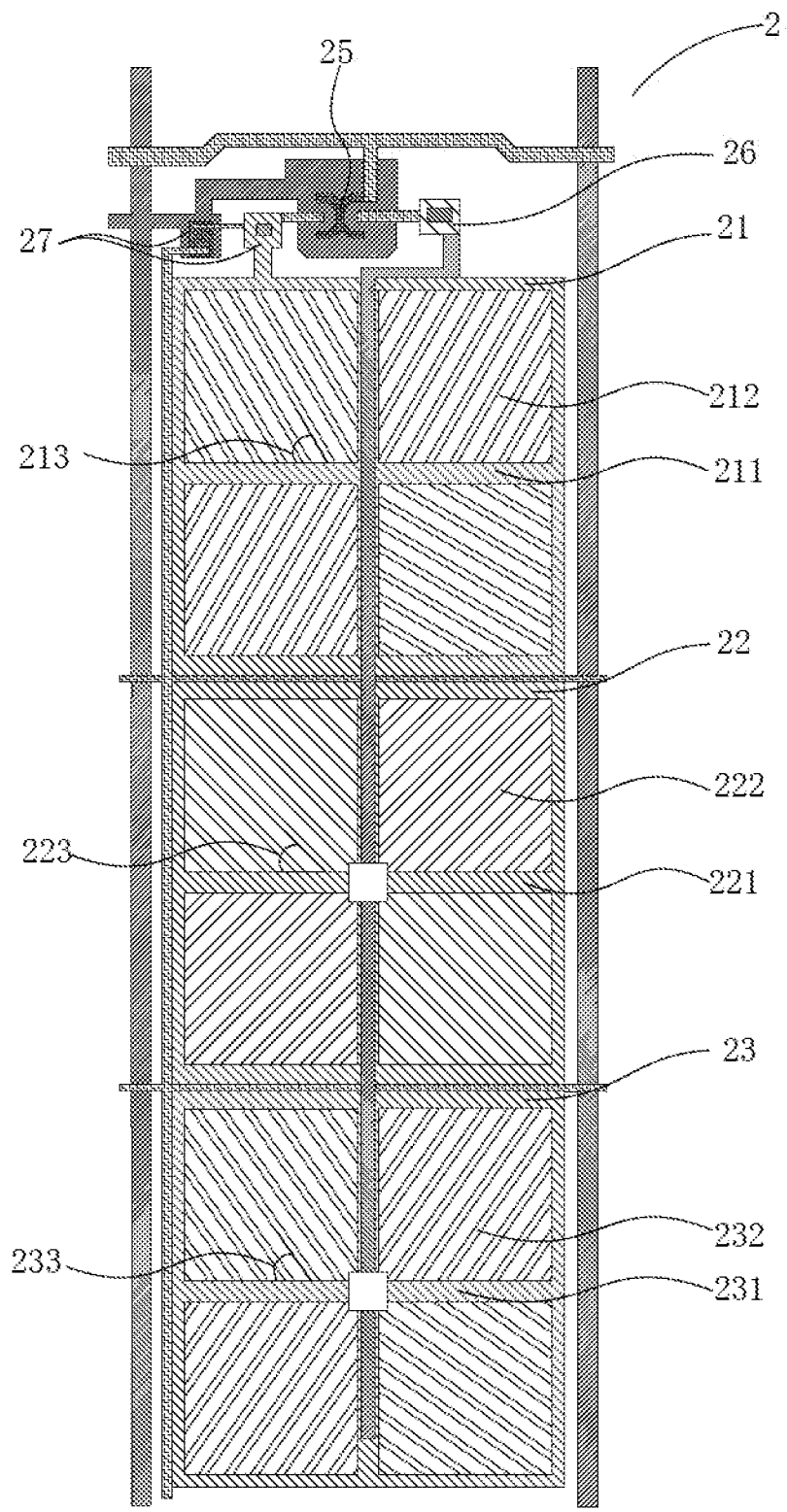
FIG. 3 is a schematic diagram of another 12-domain pixel structure according to an embodiment of this application.

In another embodiment of this application, referring to FIGS. 3 and 6, a display panel 1 is disclosed, and the display panel 1 includes:

a first substrate 3;

a second substrate 5, arranged opposite to the first substrate 3;

a liquid crystal layer 4, sandwiched between the first substrate 3 and the second substrate 5; and a pixel structure 2, arranged on the first substrate 3, where the pixel structure 2 includes a first subpixel 21 and a second subpixel 22;

a pixel electrode 214 of the first subpixel 21 includes a first horizontal trunk line 211 and a first domain line 212, and an acute angle between the first horizontal trunk line 211 and the first domain line 212 is a first angle 213;

a pixel electrode 224 of the second subpixel 22 includes a second horizontal trunk line 221 and a second domain line 222, and an acute angle between the second horizontal trunk line 221 and the second domain line 222 is a second angle 223; and different data voltages are applied to the pixel electrodes 214 and 224 of the first subpixel 21 and the second subpixel 22.

The pixel structure 2 includes the first subpixel 21 and the second subpixel 22. By applying different data voltages to the areas of the first subpixel 21 and the second subpixel area 22, tilt angles of liquid crystal of the first subpixel 21 and the second subpixel 22 may be controlled to be different, and the liquid crystal turns from a vertical state to a horizontal state.

As a result, when the display panel is viewed at different viewing angles, the liquid crystal has relatively strong viewing angle dependency, and visual compensation at different viewing angles is enhanced, and because liquid crystal deflection angles of the first subpixel 21 and the second subpixel 22 are different, color cast effects can be reduced.

In this embodiment, optionally, the first angle 213 and the second angle 223 are equal.

The first angle 213 and the second angle 223 are equal, and different data voltages are applied to the pixel electrodes 214 and 224 of the first subpixel 21 and the second subpixel 22. Therefore, a lighting structure does not need to be changed, and the tilt angles of the liquid crystal can be changed provided that a circuit structure is changed, so that visual compensation at different viewing angles is enhanced, color cast effects are reduced, and procedures in the process are reduced, thereby facilitating production.

In this embodiment, optionally, the pixel structure 2 includes: a bidirectional thin film transistor 25, where two ends of the bidirectional thin film transistor 25 are capable of transmitting a data voltage that is supplied from the data line 29;

a first bleeder portion 26, connected to one end of the bidirectional thin film transistor 25 and to the pixel electrode 214 of the first subpixel 21;

a second bleeder portion 27, connected to the other end of the bidirectional thin film transistor 25 and to the pixel electrode 224 of the second subpixel 22.

The two ends of the bidirectional thin film transistor 25 are capable of transmitting a data voltage that is supplied from the data line 29. The pixel electrodes 214 and 224 of the first subpixel 21 and the second subpixel 22 are connected to the bidirectional thin film transistor 25 by using the first bleeder portion 26 and the second bleeder portion 27. Voltages are directed away by using the first bleeder portion 26 and the second bleeder portion 27, so that the voltages of the first subpixel 21 and the second subpixel 22 are different, and the tilt angles of the liquid crystal are changed, thereby enhancing visual compensation at different viewing angles and reducing color cast effects.

In this embodiment, optionally, one end 261 of the first bleeder portion 26 is directly connected to the pixel electrode 214 of the first subpixel 21 and to a common voltage line 28 of the pixel structure 2, and the other end is connected to the bidirectional thin film transistor 25.

One end 271 of the second bleeder portion 27 is directly connected to the pixel electrode 224 of the second subpixel 22, and the other end is connected to the bidirectional thin film transistor 25.

Voltages output at the two ends of the bidirectional thin film transistor 25 are the same. The pixel electrode 214 of the first subpixel 21 and the common voltage line 28 of the pixel structure 2 are connected at the first bleeder portion 26. A fraction of the voltage output by the bidirectional thin film transistor 25 is directed away by the common voltage line 28, and the pixel electrode 224 of the second subpixel 22 is directly connected to the bidirectional thin film transistor 25 by using the second bleeder portion 27 without using any other bleeder component, so as to achieve different voltages for the first subpixel 21 and the second subpixel 22.

In this embodiment, optionally, the pixel structure 2 includes a third subpixel 23 and a first vertical trunk portion.

The first vertical trunk portion 33 is located in middle parts of the first subpixel 21, the second subpixel 22 and the third subpixel 23, and intersects with and is perpendicular to the first horizontal trunk line 211, the second horizontal trunk line 221 and a third horizontal trunk line 231.

A pixel electrode 234 of the third subpixel 23 includes a third domain line 232 and the third horizontal trunk line 231.

An acute angle between the third domain line 232 and the third horizontal trunk line 231 is a third angle 233.

The third angle 233 and the second angle 223 are different.

Voltages of the second subpixel 22 and the third subpixel 23 are the same.

Based on the first subpixel 21 and the second subpixel 22, a group of third subpixels 23 are added to the pixel structure 2. An acute angle between the third domain line 232 and the third horizontal trunk line 231 on the third subpixel 23 is the third angle 233. The third angle 233 and the second angle 223 of the second subpixel 22 are different. The pixel electrodes 224 and 234 of the second subpixel 22 and the third subpixel 23 are connected by using a connection line of the first vertical trunk portion 33, and a connection point is located at an intersection position of the first vertical trunk portion with the second horizontal trunk line 221 and the third horizontal trunk line 231, so that the data voltages applied to the areas of the first subpixel 21 and the third subpixel 23 are the same. The first angle 213 and the third angle 233 are different, and tilt angles of liquid crystal are different, thereby enhancing visual compensation of the liquid crystal at different viewing angles and reducing color cast effects. The connection line at the first vertical trunk portion 33 may further be used to block light leakage at the first vertical trunk portion 33 in addition to transmitting voltage.

In this embodiment, optionally, the first angle 213, the second angle 223, and the third angle 233 are in an angle range of 2° to 82°.

The first angle 213, the second angle 223 and the third angle 233 are set to 2° to 82°, so that color cast effects can be effectively compensated, thereby ensuring compensation in a relatively large viewing angle range, and ensuring an optimal state of display effect. In this application, the angle range is not limited to 2° to 82°.

In another embodiment of this application, referring to FIGS. 2 and 6, a display panel 1 is disclosed, and the display panel 1 includes:

a first substrate 3;

a second substrate 5, arranged opposite to the first substrate 3;

a liquid crystal layer 4, sandwiched between the first substrate 3 and the second substrate 5; and a pixel structure 2, arranged on the first substrate 3, where the pixel structure 2 includes a first subpixel 21 and a second subpixel 22;

a pixel electrode 214 of the first subpixel 21 includes a first horizontal trunk line 211 and a first domain line 212, and an acute angle between the first horizontal trunk line 211 and the first domain line 212 is a first angle 213;

a pixel electrode 224 of the second subpixel 22 includes a second horizontal trunk line 221 and a second domain line 222, and an acute angle between the second horizontal trunk line 221 and the second domain line 222 is a second angle 223; and different data voltages are applied to the pixel electrodes 214 and 224 of the first subpixel 21 and the second subpixel 22.

The pixel structure 2 includes the first subpixel 21 and the second subpixel 22. By applying different data voltages to the areas of the first subpixel 21 and the second subpixel area 22, tilt angles of liquid crystal of the first subpixel 21 and the second subpixel 22 may be controlled to be different, and the liquid crystal turns from a vertical state to a horizontal state. As a result, when the display panel is viewed at different viewing angles, the liquid crystal has relatively strong viewing angle dependency, and visual compensation at different viewing angles is enhanced, and because liquid crystal deflection angles of the first subpixel 21 and the second subpixel 22 are different, color cast effects can be reduced.

In this embodiment, optionally, the pixel structure 2 includes a third subpixel 23; and a pixel electrode 234 of the third subpixel 23 includes a third domain line 232 and a third horizontal trunk line 231.

An acute angle between the third domain line 232 and the third horizontal trunk line 231 is a third angle 233.

Any two of the first angle 213, the second angle 223 and the third angle 233 are different.

Any two of the first angle 213, the second angle 223, and the third angle 233 are different. Any two of the acute angle between the first horizontal trunk line 211 and the first domain line 212, the acute angle between the second domain line 222 and the second horizontal trunk line 221, and the acute angle between the third domain line 232 and the third horizontal trunk line are different, so that regardless of whether voltages of the first subpixel 21, the second subpixel 22 and the third subpixel 23 are the same, any two of the tilt angles of the liquid crystal in the areas of the first subpixel 21, the second subpixel 22, and the third subpixel 23 are different, thereby implementing visual compensation at different viewing angles and reducing color cast effects.

In this embodiment, optionally, the first angle 213, the second angle 223, and the third angle 233 are in an angle range of 2° to 82°.

The first angle 213, the second angle 223 and the third angle 233 are set to 2° to 82°, so that color cast effects can be effectively compensated, thereby ensuring compensation in a relatively large viewing angle range, and ensuring an optimal state of display effect. In this application, the angle range is not limited to 2° to 82°.

Figure 5:
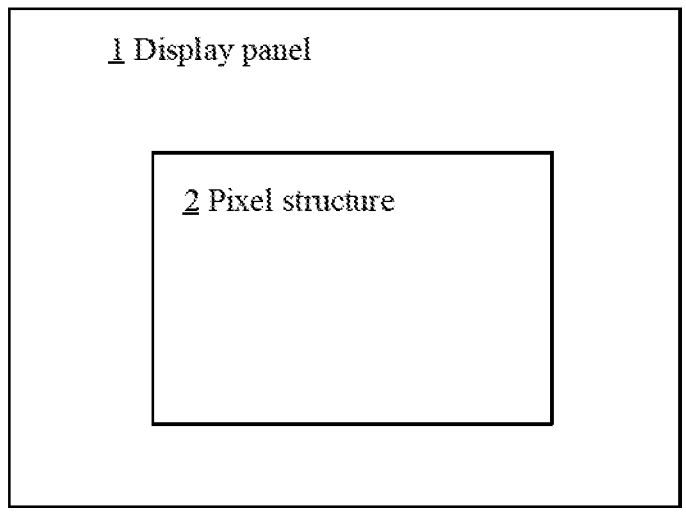
FIG. 5 is a schematic diagram of a display panel according to an embodiment of this application.

In another embodiment of this application, a display device shown in FIG. 5 includes the foregoing display panel.

The panel of this application may be a twisted nematic (TN) panel, an in-plane switching (IPS) panel, or a multi-domain vertical alignment (VA) panel, and may certainly be any other suitable type of panel.

The foregoing contents are further detailed descriptions of this application in conjunction with specific preferred embodiments, and it should not be considered that the specific implementation of this application is limited to these descriptions. A person of ordinary skill in the art can further make simple deductions or replacements without departing from the concept of this application, and such deductions or replacements should all be considered as falling within the protection scope of this application.

What is claimed is:

1. A pixel structure, comprising:
a first subpixel and a second subpixel, wherein a pixel electrode of the first subpixel comprises a first horizontal trunk line and a first domain line, and an acute angle formed between the first horizontal trunk line and the first domain line is a first angle;
a pixel electrode of the second subpixel comprises a second horizontal trunk line and a second domain line, and an acute angle formed between the second horizontal trunk line and the second domain line is a second angle; and different data voltages are applied to the pixel electrodes of the first subpixel and the second subpixel;
wherein the pixel structure further comprises a third subpixel, wherein a pixel electrode of the third subpixel comprises a third horizontal trunk line and a third domain line, and wherein an acute angle formed between the third horizontal trunk line and the third domain line is a third angle;
wherein the third angle is different than the first angle, and wherein the pixel electrodes of the first subpixel and the third subpixel are coupled to each other through a connection line arranged at a same side of the first subpixel and the third subpixel, and wherein a same data voltage is applied to the pixel electrodes of the first subpixel and the third subpixel through the connection line;
wherein the first subpixel, the second subpixel, and the third subpixel are driven by only one same gate line and one same data line.

2. The pixel structure according to claim 1, further comprising:
a bidirectional thin film transistor, wherein two ends of the bidirectional thin film transistor are capable of transmitting a data voltage that is supplied from the data line;
a first bleeder portion, wherein one end of the first bleeder portion is coupled to a first end of the bidirectional thin film transistor, and another end of the first bleeder portion is directly coupled both to the pixel electrode of the first subpixel and to a common voltage line of the pixel structure; and
a second bleeder portion, wherein one end of the second bleeder portion is coupled to a second end of the bidirectional thin film, and another end of the second bleeder portion is directly coupled to the pixel electrode of the second subpixel.

3. The pixel structure according to claim 1, wherein the first angle, the second angle, and the third angle each lie in the range of 2° to 82°.

4. The pixel structure according to claim 3, wherein the second angle is 45°.

5. The pixel structure according to claim 4, wherein the third angle is 28.4°.

6. The pixel structure according to claim 5, wherein a penetration rate of a liquid crystal of the third subpixel is 70% of a penetration rate of a liquid crystal of the first subpixel.

7. The pixel structure according to claim 1, wherein the first angle, the second angle, and the third angle are all different with respect to each other.

8. The pixel structure according to claim 1, wherein the first angle and the second angle are equal to each other.

9. The pixel structure according to claim 8, wherein the first angle and the second angle are both 45°.

10. A display device, comprising a display panel, wherein the display panel comprises:
a first substrate;
a second substrate, arranged opposite to the first substrate;
a liquid crystal layer, sandwiched between the first substrate and the second substrate; and
the pixel structure according to claim 1.

11. A pixel structure, comprising:
a first subpixel, wherein a pixel electrode of the first subpixel comprises a first horizontal trunk line and a first domain line, and an acute angle formed between the first horizontal trunk line and the first domain line is a first angle;

a second subpixel, wherein a pixel electrode of the second subpixel comprises a second horizontal trunk line and a second domain line, and an acute angle formed between the second horizontal trunk line and the second domain line is a second angle;

a third subpixel, wherein a pixel electrode of the third subpixel comprises a third horizontal trunk line and a third domain line, and an acute angle formed between the third horizontal trunk line and the third domain line is a third angle; and a first vertical trunk portion, disposed corresponding to a midline of the pixel electrodes of the first, second and third subpixels and perpendicularly crossing over the first horizontal trunk line, the second horizontal trunk line, and the third horizontal trunk line, wherein the first vertical trunk portion is electrically coupled to both the second horizontal trunk line and the third horizontal trunk line;

wherein different data voltages are applied to the pixel electrodes of the first subpixel and the second subpixel; wherein the third angle is different than the second angle; and wherein a same data voltage is applied to the pixel electrodes of the second subpixel and the third subpixel through the first vertical trunk portion;

wherein the first subpixel, the second subpixel, and the third subpixel are driven by only one same gate line and one same data line.

12. The pixel structure according to claim 11, further comprising:

a bidirectional thin film transistor, wherein two ends of the bidirectional thin film transistor are capable of transmitting a data voltage that is supplied from the data line;

a first bleeder portion, wherein one end of the first bleeder portion is coupled to a first end of the bidirectional thin film, and another end of the first bleeder portion is directly coupled both to the pixel electrode of the first subpixel and to a common voltage line of the pixel structure; and a second bleeder portion, wherein one end of the second bleeder portion is coupled to a second end of the bidirectional thin film, and another end of the second bleeder portion is directly coupled to the pixel electrode of the second subpixel.

13. The pixel structure according to claim 11, wherein the first angle, the second angle, and the third angle each lie in the range of 2° to 82°.

14. The pixel structure according to claim 13, wherein the first angle, the second angle, and the third angle are all different with respect to each other.

15. The pixel structure according to claim 13, wherein the first angle and the second angle are equal to each other.

16. A display device, comprising a display panel, wherein the display panel comprises:

a first substrate;

a second substrate, arranged opposite to the first substrate;

a liquid crystal layer, sandwiched between the first substrate and the second substrate; and the pixel structure according to claim 11.

17. A display panel, comprising:

a first substrate;

a second substrate, arranged opposite to the first substrate;

a liquid crystal layer, sandwiched between the first substrate and the second substrate;

a pixel structure, arranged on the first substrate and comprising a first subpixel, a second subpixel, and a third subpixel; wherein a pixel electrode of the first subpixel comprises a first horizontal trunk line and a first domain line, and an acute angle formed between the first horizontal trunk line and the first domain line is a first angle; a pixel electrode of the second subpixel comprises a second horizontal trunk line and a second domain line, and an acute angle formed between the second horizontal trunk line and the second domain line is a second angle; a pixel electrode of the third subpixel comprises a third domain line and a third horizontal trunk line, and an acute angle formed between the third domain line and the third horizontal trunk line is a third angle; and wherein different data voltages are applied to the pixel electrodes of first subpixel and the second subpixel, and a same data voltage is applied to the pixel electrodes of the first subpixel and the third subpixel; wherein the first subpixel, the second subpixel, and the third subpixel are driven by only one same gate line and one same data line;

a bidirectional thin film transistor, wherein two ends of the bidirectional thin film transistor are capable of transmitting a data voltage that is supplied from the data line;

a first bleeder portion, wherein one end of the first bleeder portion is coupled to a first end of the bidirectional thin film, and another end of the first bleeder portion is directly coupled both to the pixel electrode of the first subpixel and to a common voltage line of the pixel structure; and a second bleeder portion, wherein one end of the second bleeder portion is coupled to a second end of the bidirectional thin film, and another end of the second bleeder portion is directly coupled to the pixel electrode of the second subpixel;

wherein both the first angle and the second angle are 45°, and the third angle is 28.4°.

18. The display device according to claim 17, further comprising:

a bidirectional thin film transistor, wherein two ends of the bidirectional thin film transistor are capable of transmitting a data voltage that is supplied from the data line corresponding to the pixel structure;

a first bleeder portion, wherein one end of the first bleeder portion is coupled to a first end of the bidirectional thin film transistor, and another end of the first bleeder portion is directly coupled both to the pixel electrode of the first subpixel and to a common voltage line of the pixel structure; and a second bleeder portion, wherein one end of the second bleeder portion is coupled to a second end of the bidirectional thin film transistor, and another end of the bleeder portion is directly coupled to the pixel electrode of the second subpixel.

* * * * *